United States Patent [19]

Yuda

[11] Patent Number: 4,571,773
[45] Date of Patent: Feb. 25, 1986

[54] DAMPER FOR BRAKING ROTATION
[75] Inventor: Takuo Yuda, Yokohama, Japan
[73] Assignee: Nifco Inc., Yokohama, Japan
[21] Appl. No.: 618,700
[22] Filed: Jun. 8, 1984
[51] Int. Cl.⁴ .............................................. E05F 5/08
[52] U.S. Cl. .................................... 16/85; 16/DIG. 10
[58] Field of Search ............. 16/82, 51, 86 B, DIG. 9, 16/DIG. 21, 225, 85, 334; 188/290, 381, 271

[56] References Cited
U.S. PATENT DOCUMENTS 3,272,289  9/1966  Vermont et al. ..................... 188/290
4,342,135  8/1982  Matsuo et al. .......................... 16/82
4,468,836  9/1984  Omata .................................... 16/82

Primary Examiner—Donald R. Schran
Assistant Examiner—James L. Wolfe
Attorney, Agent, or Firm—Albert J. Brunett; Thomas W. Buckman

[57] ABSTRACT

A rotation-braking damper comprises a housing formed of a cap and a case, a shaft provided at the external end thereof with a toothed wheel and inserted on the internal end thereof into the housing, a disk fastened to the internal end of the inserted shaft, and a lock washer disposed inside the housing as held in contact with the disk. By the lock washer, the shaft in rotation is braked against the cap. The damper of this invention produces a desired braking effect on° an opening-closing object such as a lid. The damper can be constructed with a small number of component parts.

3 Claims, 6 Drawing Figures the shaft, with the result that the shaft 1 will be prevented from slipping off the cap 4. Then, the lock washer 9 is fitted around the shaft 1 projected out of the cap and the disk 2 is fitted around the square shaft portion 1a. Thereafter, the toothed wheel 1' is fitted around the shaft 1. Since the arms 9b of the lock washer 9 are bent back in the shape of the letter "U" or "V", they thrust the disk 2 toward the leading end of the shaft 1 and enable the disk 2 and the lock washer 9 to be kept in close mutual contact. Eventually, the case 3 is fitted over the cap to complete the assembly. The disk 2 and the lock washer 9 are rotated in conjunction with the rotation of the shaft 1 and, at this time, the braking force proportionate to the frictional resistance occurring between the disk 2 and the lock washer 9 is generated.

DAMPER FOR BRAKING ROTATION

BACKGROUND OF THE INVENTION

This invention relates to a rotation-braking damper for braking and absorbing opening and closing motions of an opening-closing object such as a lid or a door.

For the purpose of absorbing a rising motion which the cassette tape holder in a cassette recorder or video tape recorder produces after it has been released from its contained state, the friction type damper (Japanese Utility Model Application Disclosure SHO No. 55(1980)-75805) and the oil type damper (U.S. Pat. No. 4,342,135) have been adopted. The friction type damper is defective in that it does not produce smooth braking, gives an uncomfortable sensation upon the user's hand, and is complicated in structure. The oil type damper entails problems of its own which, unlike the problems suffered by the friction type damper, are ascribable to the use of oil. To be specific, this damper uses a silicone oil of high viscous drag. This silicone oil has an unusually high thermal expansion coefficient and, therefore, is readily expanded by a rise in the temperature of the ambient air. When the temperature of the ambient air of the recorder using the oil type damper rises, therefore, the oil is inflated and consequently leaks through the gap between the case forming a housing for the cassette and the cap or the gap between the shaft of a toothed wheel and the hole in the case penetrated by the shaft and soils the exterior of the case. When the temperature falls, the oil within the housing shrinks and this decrease in the volume of the oil deprives the damper proportionately of its effect. To avoid the trouble, the housing is required to incorporate therein a device adapted to absorb the voluminal change of the oil. The use of this device entails an addition to the number of component parts of the damper.

SUMMARY OF THE INVENTION

An object of this invention is to provide a rotation-braking damper of simple mechanism which avoids using the oil mechanism and is thus free of the damper that its function may be affected by changes in the ambient temperature and also avoids using the conventional friction type mechanism incapable of withstanding long use, and which provides effective smooth braking of opening and closing motions of an opening-closing object such as a lid or a door.

The object described above is accomplished by providing a rotation-braking damper characterized by fastening a disk to a shaft penetrated through a cap and adapted to transmit the force of rotation, disposing a lock washer between the cap and the disk, and keeping the disk and the lock washer in mutual contact.

The cap thus containing the lock washer and the disk therein is fitted and sealed in the case serving as a lid. The shaft projected out of the cap is provided thereon with a rotation transferring means such as a toothed wheel. The fastening in place of the shaft so provided with the toothed wheel is accomplished by causing the circumferential edge of the hole formed in the cap for passage of the shaft to be projected as tapered toward the leading end so as to form a fastening piece and allowing this fastening piece to invade an annular groove formed in the shaft. Owing to the construction of this invention described above, the damper is formed of a small number of component parts and, therefore, is easy of assembly and inexpensive.

The other objects and characteristic features of this invention will become apparent as the further disclosure of the invention is made in the following detailed description of a preferred embodiment, with reference to the accompanying drawings.

DESCRIPTION OF THE PREFERRED EMBODIMENT

Figure 1:
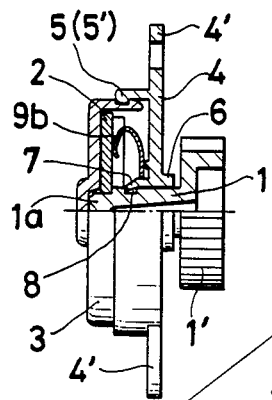
FIG. 1 is a cross section of a typical rotary damper of this invention in an assembled state.
Figure 2:
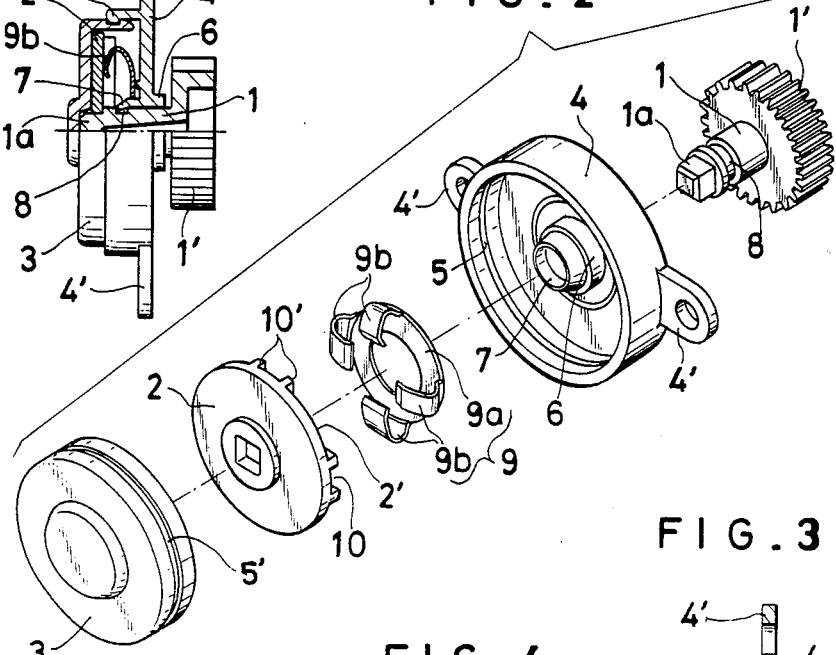
FIG. 2 is a perspective view of the damper in an exploded state.
Figure 3:
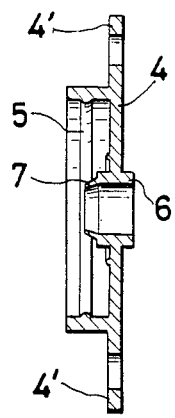
FIG. 3 is a cross section of a cap of the damper.
Figure 4:
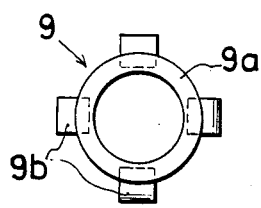
FIG. 4 is a front view of a disk of the damper.
Figure 5:
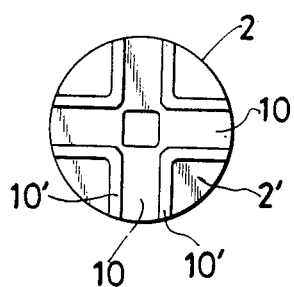
FIG. 5 is a front view of a lock washer of the damper.
Figure 6:
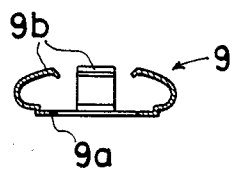
FIG. 6 is a cross sectional view of the lock washer in FIG. 5.

A shaft 1 is adapted to transfer the force of rotation by means of a toothed wheel 1', for example, a disk 2 is enabled to rotate in conjunction with the shaft 1 by having a square hole at the center thereof fitted around a square shaft portion 1a formed at the leading end of the shaft 1, and a case 3 and a cap 4 are adapted to be combined with each other to complete a housing. All these component parts, or at least the case and the cap, are formed of a plastic material. Fitting arms 4' are integrally formed on the cap 4. When the case 3 and the cap 4 are opposed to each other and then pushed in toward each other, they are snapped into mutual union to complete the housing as continuous or discontinuous ridge 5 and groove 5' formed respectively on the inner peripheral wall of one of the two parts under discussion and the outer peripheral wall of the other are brought into snapping engagement.

The cap 4 is provided at the center thereof with a tubular part 6 of an inside diameter equal to or slightly larger than the outside diameter of the shaft 1 to permit passage of the shaft 1 therethrough. The wall of the tubular part 6 has its thickness gradually decreased toward the leading end to give rise to a tapered fitting piece 7. The fitting piece 7, as in the illustrated embodiment, is desired to be annularly continuous similarly to the tubular part 6. Optionally, one or a plurality of notches may be cut in the fitting piece 7 so that the notches will break the annular continuity thereof. The shaft 1 is provided in advance therein with an annular groove 8 adapted to admit the leading end of the aforementioned fitting piece 7 and prevent the shaft from slipping off the cap.

By 9 is denoted a lock washer formed by being punched out of a thin sheet of stainless steel and then shaped as required. It may otherwise be a belleville spring. In the present embodiment, the lock washer 9 comprises an annular part 9a which fits loosely around the shaft 1 and a plurality of arms 9b radially extended outwardly as equally spaced from the outer boundary of the annular part and bent back over one suface of the annular part 9a each in the shape of the letter "U" or "V".

The assembly, therefore, is started by driving the leading end 1a of the shaft 1 into the tubular part 6 of the cap and thrust out on the inner surface of the cap. Consequently, the fitting piece 7 at the leading end of the tubular part 6 fits into the annular groove 8 on the shaft to prevent the shaft from slipping off the cap and, at the same time, squeeze the shaft radially.

Then, the lock washer 9 is slipped over the shaft inwardly from the leading end thereof and subsequently the disk 2 is fitted around the square shaft part. The disk 2 is brought into contact with the inner bottom surface of the case and the cap is driven into the case and brought into snapping engagement therewith. Consequently, there is completed a housing. As a result, the lock washer 9 is radially compressed to press the disk 2 with the resilient force thereof against the inner bottom surface of the case. When necessary, an oil film may be interposed between the inner bottom surface of the case and the end surface of the disk or a thin sheet of slippery substance may be used in place of the oil film to smooth the slippage of the disk against the case.

When the force of rotation is conveyed through the toothed wheel 1', for example, to the shaft 1, therefore, since the shaft 1 is radially squeezed by the fitting piece 7 and the disk 2 adapted to rotate in conjunction with the shaft is retained in frictional contact with the inner bottom surface of the cap under the pressure of the lock washer 9, the aforementioned squeezing force and the friction produce effective braking of the force of rotation. The number of component parts forming this damper is small. The disk has only to be fitted slidably around the square shaft part of the shaft 1. Then the case and the cap have to be snapped into mutual union to complete the housing. Thus, the assembly of the damper of this invention is very simple and does not require much time or labor. In the present embodiment, the disk 2 is provided on the inside around the peripheral edge 2' with depressions 10 formed between raised strips 10' so as to admit the arms 9b of the lock washer one each. In this arrangement, the lock washer is allowed to rotate in conjunction with the disk 2 and consequently the shaft 1. This arrangement is advantageous in the light of the fact that, since the lock washer used in this embodiment possesses the arms 9b, these arms are liable to inflict scratches upon the inner end surface 2' of the disk and the portions generating frictional force are liable to occur as dispersed to render desired stabilization of torque difficult when the lock washer and the disk 2 are allowed to rotate relative to each other. When a belleville spring which has no such arms is used in place of the lock washer, this spring may be rotated in conjunction with the disk 2 because there is no possibility of entailing the problem mentioned above.

What is claimed is:

1. A rotation-braking damper, comprising:
   a cylindrical housing consisting of a cap at one end provided at the center thereof with an aperture, a fitting piece and a case adapted to be fitted into said cap;
   a shaft insertable into said aperture having shoulder means along its length for cooperation with said fitting piece and being rotatable within said fitting piece;
   a non-rotatable disk fastened to the leading end of said shaft on a radial plane to the axis of said shaft and inserted home into said housing; and
   a spring means for biasing said disk in an axial direction against the other end of said housing to provide braking of said shaft.

2. A damper according to claim 1, wherein said spring means is formed of an annular part containing a plurality of arms radially extended outwardly from the peripheral boundary of said annular part and bent back over one side of said annular part so that said arms are held in spring biasing contact with said disk.

3. A damper according to claim 2, wherein said disk is provided thereon with radially extending raised strips, which interfit with said plurality of radially extending arms in a non-rotatable manner.

* * * * *